United States Patent [19]
Whurr

[11] Patent Number: 5,692,372
[45] Date of Patent: Dec. 2, 1997

[54] AIRCRAFT COMPOUND CYCLE PROPULSION ENGINE

[75] Inventor: John Whurr, Derby, England

[73] Assignee: Rolls-Royce plc, London, England

[21] Appl. No.: 573,950

[22] Filed: Dec. 14, 1995

[51] Int. Cl.⁶ ............................................. F02K 5/00
[52] U.S. Cl. ........................ 60/226.1; 60/269; 60/598
[58] Field of Search .......................... 60/226.1, 262, 60/269, 597, 598

[56] References Cited

U.S. PATENT DOCUMENTS

| | | | |
|---|---|---|---|
| 2,385,366 | 9/1945 | Lysholm | 60/269 |
| 2,518,660 | 8/1950 | Browne | 60/598 |
| 2,580,591 | 1/1952 | Pouit | 60/226.1 |
| 5,471,834 | 12/1995 | Kapich | 60/269 |

FOREIGN PATENT DOCUMENTS

| | | | |
|---|---|---|---|
| 874827 | 5/1942 | France | 60/598 |
| 200434 | 12/1938 | Switzerland | 60/598 |
| 683589 | 12/1952 | United Kingdom | 60/598 |

OTHER PUBLICATIONS

"The Wankel RC Engine", R. F. Ansdale, Iliffe Books Ltd., 1968, pp. 39–43.

Primary Examiner—Michael Koczo
Attorney, Agent, or Firm—Cushman Darby & Cushman IP Group of Pillsbury Madison & Sutro LLP

[57] ABSTRACT

A ducted fan aircraft compound cycle engine comprises a core engine which includes a compressor, three rotary internal combustion engines fed by the compressor and a power turbine to receive the combustion products of the rotary and combustion engines. The rotary internal combustion engines drive the compressor and the power turbine drives the fan. The engine combines the thermal efficiency of the rotary internal combustion engine with the compact size and light weight of the gas turbine engines.

9 Claims, 3 Drawing Sheets

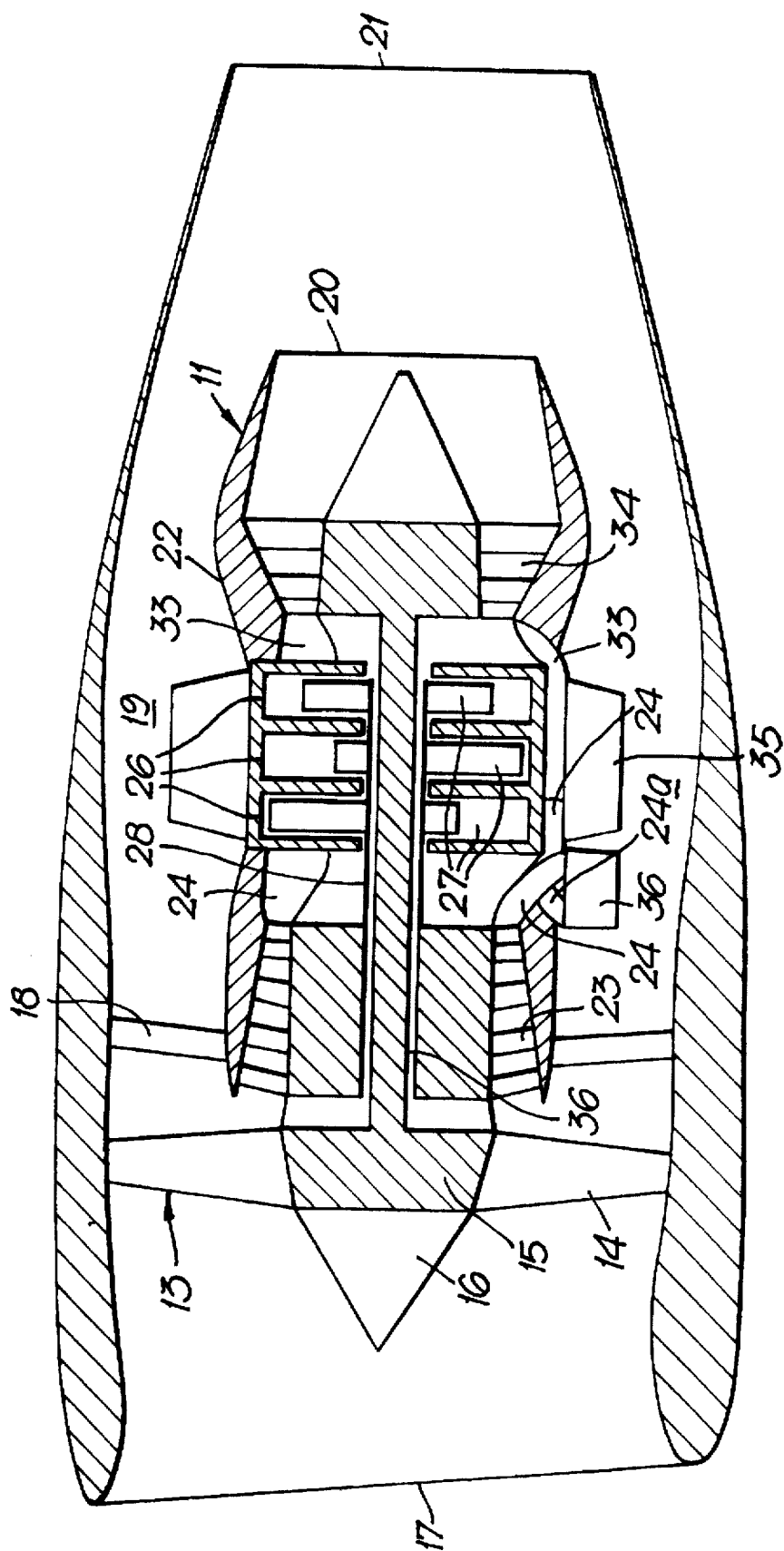

AIRCRAFT COMPOUND CYCLE PROPULSION ENGINE

This invention relates to an aircraft compound cycle propulsion engine.

It is well known that internal combustion engines are capable of achieving higher thermal efficiency than gas turbine engines. However, the smaller size and lighter weight of gas turbine engines for a given power output has meant that they are generally used in preference to internal combustion engines in aircraft propulsion.

There have been attempts to combine the advantages of internal combustion and gas turbine engines in so-called compound cycle engines. Such an engine is described in GB2201467A and comprises a propulsive fan which is driven by a reciprocating internal combustion via a drive transmission. A compressor receives a portion of the air compressed by the fan and directs it to the internal combustion engine where it is mixed with fuel and the mixture is combusted within the engine. The resultant exhaust gases are then used to drive a turbine which in turn drives the compressor.

NASA report No TM X-71906 "Preliminary Evaluation of a Turbine/Rotary Combustion Compound Engine for a Subsonic Transport" by Civinskas and Kraft March 1976 describes a similar type of compound cycle engine. In that engine, the conventional combustor of a turbofan engine is replaced by a rotary internal combustion engine. Instead of having two spools within individual shafts, the compressor, rotary engine and turbine are all mounted on a single shaft. The engine's fan is also powered by the shaft via a suitable gearbox.

One of the major drawbacks with compound turbofan engines of the general type described in these two references is that the fan is mechanically linked to the output shaft of the internal combustion engine. This necessitates the use of a gearbox between the fan and the internal combustion engine which is undesirable in view of the weight and power absorption penalties which it provides. A further significant problem in the case of the engine of the NASA reference is that the direct mechanical interconnection of the fan, internal combustion engine, compressor and turbine is likely to give rise to problems of component aerodynamic mismatching under certain engine operating conditions. This could lead in turn to compressor handling problems with the possibility of the compressor surging. A surge usually occurs when the air flow through the compressor stalls and can result in a potentially damaging reversal of the airflow through the compressor.

It is an object of the present invention to provide a compound cycle aircraft engine in which such drawbacks are substantially avoided.

According to the present invention, an aircraft compound cycle propulsion engine comprises a propulsive fan and a core engine to power said fan core engine comprising an air compressor downstream of said fan, at least one rotary internal combustion engine configured to receive compressed air from said air compressor, a power turbine positioned to receive and to be powered by the exhaust efflux of said at least one rotary internal combustion engine, a first shaft drivingly interconnecting said power turbine and said propulsive fan, and a second shaft drivingly interconnecting said at least one rotary internal combustion engine and said air compressor.

The present invention will now be described, by way of example, with reference to the accompanying drawings in which:

FIG. 3 is a schematic sectioned side view of an alternative ducted fan compound cycle propulsion engine in accordance with the present invention.

Figure 1:
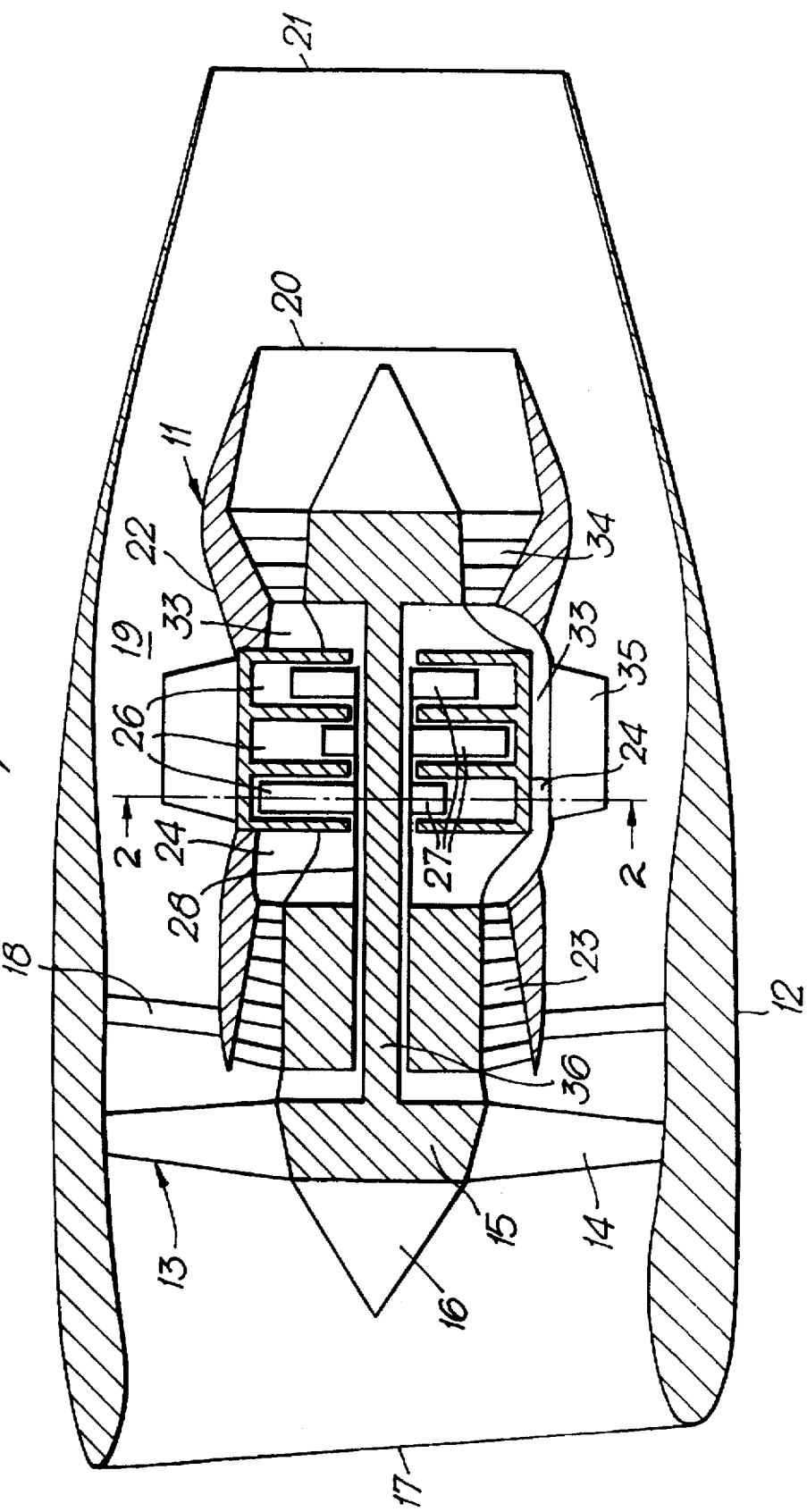
FIG. 1 is a schematic sectioned side view of a ducted fan compound cycle propulsion engine in accordance with the present invention.

With reference to FIG. 1, a ducted fan compound cycle aircraft propulsion engine generally indicated at 10 comprises a core engine 11 enclosed within an elongate annular cowling 12. The core engine 11 drives a propulsive fan 13 positioned at its upstream end. The fan 13 is of generally conventional construction comprising an annular array of radially extending aerofoil blades 14 mounted on a common hub 15. A nose cone 16 positioned on the upstream face of the hub 15 ensures a smooth flow of air from the intake 17 of the cowling 12 into the fan 13.

The fan 13 serves to pressurise air which has entered the cowling 12 through the intake 17. The pressurised air flow exhausted from the fan 13 is divided into two portions. The larger portion passes over an annular array of guide vanes 18 interposed between the core engine 11 and the cowling 12 before flowing through an annular passage 19 defined between the core engine 11 and the cowling 12. That air flow then mixes with the hot exhaust efflux issued from the downstream end 20 of the core engine 11 before being exhausted from a nozzle 21 defined by the downstream end of the cowling 12 to provide propulsive thrust.

Although in the present embodiment, the cowling 12 extends downstream of the downstream end 20 of the core engine 11, it will be appreciated that in certain situations this may not always be necessary. The cowling 12 could be shorter, terminating upstream of the core engine downstream end 20. Moreover, it may be desirable to dispense with the cowling 12 altogether and replace the fan 13 with a propeller or a so-called propfan. Consequently, the term "fan" as used in the present specification and claims should be construed as embracing both propellers and propfans.

The core engine 11 is cowled to define a smooth radially outer surface 22 which constitutes the radially inner boundary of the annular air passage 19.

Figure 2:
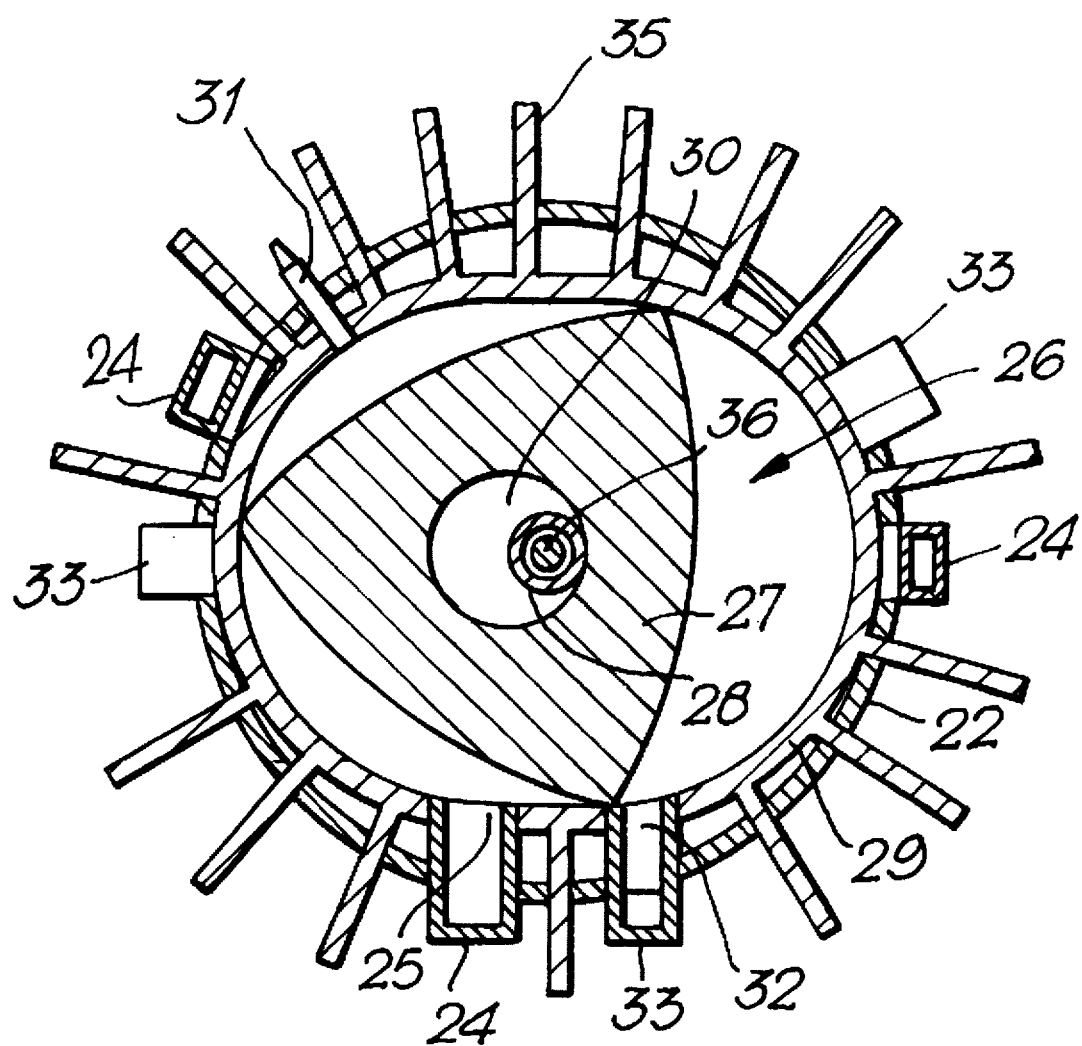
FIG. 2 is a view on section line 2—2 of FIG. 1.

The remaining smaller portion of the pressurised air flow exhausted from the fan 13 is directed into an axial flow compressor 23 which is positioned at the upstream end of the core engine 11. The compressor 23 is of conventional configuration and comprises axially alternate annular arrays of rotor blades and stator vanes. The pressurised air exhausted from the downstream end of the compressor 23 is directed into three equally circumferentially spaced apart axially extending ducts 24 positioned on the external surface 22 of the core engine 11. Each duct 24, which can be seen more easily in FIG. 2, directs the compressed air into the intake port 25 of one of three similar axially aligned rotary internal combustion engines 26 contained within the core engine 11.

Each rotary internal combustion engine 26 is of the conventional direct injection stratified charge "Wankel" type and comprises a rotor 27 which rotates eccentrically about, and thereby drives a common hollow shaft 28 within a casing 29. The rotor 27 has a central hole 30 which is toothed (not shown) to engage corresponding teeth (also not shown) provided on the teeth of an annular member fixed to the wall of the motor housing.

Fuel is introduced into the compressed air flow immediately prior to its entry into the intake 25 by conventional means (not shown). That fuel and air mixture is then further compressed by the rotary motion of the rotors 27 before being ignited by an igniter 31. The resultant combustion products then expand, driving the rotor 27, before being exhausted through an exhaust port 32. The exhaust port 32 is situated alongside the inlet port 25 and directs the combustion products into an exhaust duct 33.

There are three exhaust ducts 33; one being associated with each rotary internal combustion engine 26. They extend in an axially downstream direction along the external surface 22 of the core engine 11 to terminate at the upstream end of an axial flow power turbine 34. The exhaust ducts 33 direct the combustion products into the power turbine 34 so that the products expand through, and thereby drive, the turbine 34. The combustion products are then exhausted from the downstream end 20 of the core engine 11 and, as previously described, mix with and thereby augment the thrust provided by the air flow through the passage 19.

The rotary combustion engines 26 generate heat during their operation which must be dissipated in order to prevent their overheating. This is achieved by a plurality of fins 35 which are integral with the engine casing 29 and radially extend into the annular air flow passage 29. The air flowing through the passage 19 cools the fins 35 and hence the rotary combustion engines 26. The rise in temperature of the air flow through the passage 19 resulting from this thermal exchange provides a desirable enhancement of the overall thermodynamic efficiency of the engine 10. An alternate way of cooling the rotary combustion engines 26 is to pass cooling air derived from the compressor 23 through ducts provided in the casing of the engines 26 and then exhaust that air directly into the power turbine 34, thereby obviating the need for the fins 35.

The power turbine 34 is drivingly interconnected with the fan 13 by an axially extending shaft 36 which is concentric with the hollow shaft 28. Consequently, the power turbine 34 constitutes the sole power source for the fan 13. In certain circumstances, it may be desirable for the power turbine 34 to drive the fan 13 via a suitable gearbox.

There is not, therefore any direct mechanical interconnection between the rotary combustion engines 26 and the fan 13. The hollow shaft 28 which is driven by the rotary combustion engines 26, drivingly interconnects the engines 26 with the axial flow compressor 23. It will be seen therefore that since the assembly constituted by the rotary combustion engines 26 and the compressor 23 is mechanically independent of the assembly constituted by the power turbine 34 and the fan 13, there is less likelihood of operational mismatching of the various components of the engine 10. This leads in turn to the engine 10 operating with greater efficiency that would have been the case if compromises in component matching had been necessary.

Under certain circumstances it may be desirable to enhance the efficiency of the engine 10 still further by the use of an intercooler. Such an intercooler 36 is shown in FIG. 3. The intercooler 36 is positioned in the air passage 19 so that it is exposed to a portion of the air flowing through the passage 19. There are three intercoolers 36, each one associated with one of the air ducts 24 interconnecting the compressor 23 with the rotary combustion engines 26. Thus air exhausted from the compressor 23 and which has been heated during the compression process is directed through the ducts 24 into the intercoolers 36. There the air is placed in heat exchange relationship with the relatively cool air flowing through the passage 19. The cooled air is then directed into the rotary combustion engines 26 through ducts 24a. Cooling the air in this manner results in further improvement in the overall efficiency of the engine 10.

The compound cycle propulsion engine 10 in accordance with the present invention provides a turbofan engine which is light and compact and thereby suitable for aircraft propulsion and which also embodies the thermal efficiency of a rotary combustion engine. Consequently the engine 10 enjoys the weight and size advantage of a conventional gas turbine engine in addition to the low fuel consumption of an Otto cycle engine.

I claim:

1. An aircraft compound cycle propulsion engine comprising a propulsive fan and a core engine to power said fan, said core engine comprising an air compressor downstream of said fan, at least one rotary internal combustion engine configured to receive compressed air from said air compressor, a power turbine positioned to receive and be powered by the exhaust efflux of said at least one rotary internal combustion engine, a first shaft drivingly interconnecting only said power turbine and said propulsive fan, and a second shaft drivingly interconnecting said at least one rotary internal combustion engine and said air compressor.

2. An aircraft compound cycle propulsion engine as claimed in claim 1 wherein said fan is enclosed within a cowling.

3. An aircraft compound cycle propulsion engine as claimed in claim 2 wherein said cowling and said core engine together define an annular air flow duct.

4. An aircraft compound cycle propulsion engine as claimed in claim 1 wherein said core engine includes three of said rotary internal combustion engines.

5. An aircraft compound cycle propulsion engine as claimed in claim 1 wherein said first and second shafts are concentric.

6. An aircraft compound cycle propulsion engine as claimed in any claim 1 wherein said at least one rotary internal combustion engine is provided with cooling fins positioned so as to protrude into the flow path of air exhausted from said fan.

7. An aircraft compound cycle engine as claimed in claim 1 wherein at least one intercooler is positioned in the flow path of air exhausted from said fan, said intercooler being arranged so as to place at least part of the air exhausted from said fan in heat exchange relationship with air exhausted from said compressor prior to said air from said compressor being received by said at least one rotary internal combustion engine.

8. An aircraft compound cycle engine as claimed in claim 1 wherein said compressor is of the axial flow type.

9. An aircraft compound cycle engine as claimed in claim 1 wherein said turbine is of the axial flow type.

* * * * *